United States Patent
Naruse et al.

(10) Patent No.: US 9,960,467 B2
(45) Date of Patent: May 1, 2018

(54) MAGNESIUM OXYGEN BATTERY

(71) Applicants: DENSO CORPORATION, Kariya-shi, Aichi-ken (JP); THE REGENTS OF THE UNIVERSITY OF MICHIGAN, Ann Arbor, MI (US)

(72) Inventors: Junichi Naruse, Kariya (JP); Donald Siegel, Ann Arbor, MI (US); Jeffrey Smith, Ann Arbor, MI (US); Gulin Vardar, Ann Arbor, MI (US); Charles Monroe, Oxford (GB)

(73) Assignees: DENSO CORPORATION, Kariya, Aichi-pref. (JP); The Regents of The University of Michigan, Ann Arbor, MI (US)

( * ) Notice: Subject to any disclaimer, the term of this patent is extended or adjusted under 35 U.S.C. 154(b) by 152 days.

(21) Appl. No.: 14/955,397

(22) Filed: Dec. 1, 2015

(65) Prior Publication Data
US 2017/0155177 A1    Jun. 1, 2017

(51) Int. Cl.
*H01M 12/08*     (2006.01)
*H01M 4/48*      (2010.01)
*H01M 4/86*      (2006.01)

(52) U.S. Cl.
CPC .......... *H01M 12/08* (2013.01); *H01M 4/8663* (2013.01); *H01M 4/483* (2013.01); *Y02E 60/128* (2013.01)

(58) Field of Classification Search
CPC ..... H01M 12/08; H01M 4/483; H01M 4/8663
See application file for complete search history.

(56) References Cited

U.S. PATENT DOCUMENTS

2014/0045071 A1*    2/2014    Sakakibara ......... H01M 10/054
429/231.6

* cited by examiner

*Primary Examiner* — Osei K Amponsah
(74) *Attorney, Agent, or Firm* — Harness, Dickey & Pierce, P.L.C.

(57) ABSTRACT

A non-aqueous type magnesium oxygen battery including a negative electrode, a positive electrode, a non-aqueous magnesium ion conductor, and a promoter is described. The negative electrode is configured to absorb magnesium and release magnesium ion. The positive electrode is configured to produce a discharge product that includes magnesium and oxygen during a discharge process of the battery. The non-aqueous magnesium on conductor is between the negative electrode and the positive electrode. The promoter is included with the positive electrode. The promoter is configured to promote $MgO_2$ (magnesium peroxide) production during the discharge process of the battery.

12 Claims, 3 Drawing Sheets

MAGNESIUM OXYGEN BATTERY

FIELD

The present disclosure relates to a magnesium oxygen battery.

BACKGROUND

This section provides background information related to the present disclosure, which is not necessarily prior art.

Rechargeable magnesium oxygen batteries are suitable for use in hybrid and electric vehicles for vehicle propulsion, but are subject to improvement. For magnesium oxygen batteries to be rechargeable, they must have a non-aqueous magnesium ion conductor. For example, a non-aqueous type magnesium oxygen battery capable of providing a discharge voltage that is greater than the discharge voltage of existing magnesium oxygen batteries would be desirable. In particular, there is a need for a high power output, high energy density by mass and by volume, magnesium oxygen battery capable of generating a discharge voltage greater than 1.1V, which is the discharge voltage of current magnesium oxygen batteries that use a 2,2,6,6-tetramethylpiperidine-oxyl (TEMPO) anion complex as an promoter. The present teachings address this need.

SUMMARY

This section provides a general summary of the disclosure, and is not a comprehensive disclosure of its full scope or all of its features.

The present teachings provide for a non-aqueous type magnesium oxygen battery including a negative electrode, a positive electrode, a non-aqueous magnesium ion conductor, and a promoter. The negative electrode is configured to absorb magnesium and release magnesium ions. The positive electrode is configured to produce a discharge product that includes magnesium and oxygen during a discharge process of the battery. The non-aqueous magnesium ion conductor is between the negative electrode and the positive electrode. The promoter is included with the positive electrode. The promoter is configured to promote $MgO_2$ (magnesium peroxide) production during the discharge process of the battery.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
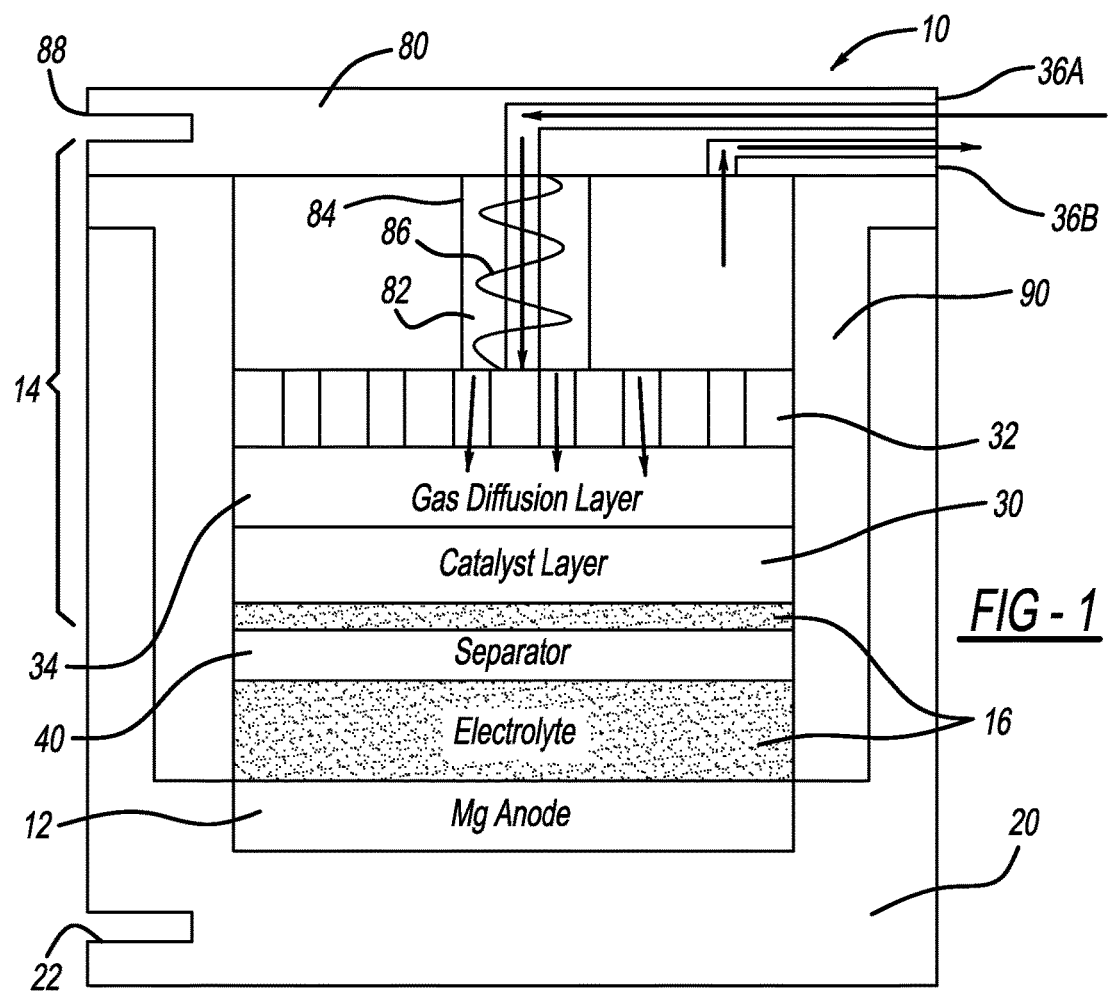
FIG. 1 is a cross-sectional view of a non-aqueous type magnesium oxygen battery according to the present teachings.

With reference to FIG. 1, an exemplary non-aqueous type magnesium oxygen battery according to the present teachings is illustrated at reference numeral 10. The battery 10 generally includes a negative electrode 12, a positive electrode 14, and a non-aqueous electrolytic solution 16 between the negative electrode 12 and the positive electrode 14. The arrangement of the battery 10 illustrated is for exemplary purposes only. The battery 10 can have numerous other configurations in addition to the configuration illustrated in FIG. 1.

The negative electrode 12 can be any suitable electrode configured to adsorb magnesium and release magnesium ions. The negative electrode 12 may include any suitable active material layer configured to adsorb and release the magnesium ion. The active material of the negative electrode 12 is not limited to a specific material. Instead, the active material may be any suitable conventional material. For example, the active material can be metallic magnesium having a diameter of 14 millimeters and a thickness of 0.1 millimeters (with 99.9% purity made by Goodfellow Cambridge Limited, for example). Alternatively, the active material may be a metallic material such as magnesium alloy, or a compound for adsorbing and releasing the magnesium ion. Still further, the active material may be a combination of these materials. An accessory component of the magnesium alloy may be included, such as aluminum, zinc, manganese, silicon, calcium, iron, copper or nickel. The negative electrode 12 can be arranged in any suitable manner, such as on a lower casing 20 of the battery 10, for example. The lower casing 20 may be made of any suitable material, such as stainless steel. The lower casing 20 can include an electrical connection location 22 for the negative electrode 12.

The negative electrode 12 can include any suitable compound for adsorbing and releasing magnesium ions, such as graphite or any other suitable material having a large capacity for charge storage. Alternatively, the compound may be made of a group 4B metallic element in the short format periodic table (or any other suitable metallic element), or a single body or alloy of half metal, such as silicon and tin, or the like. Specifically, the compound may be made of an alloy including silicon and/or tin, or a carbon material such as graphite and amorphous carbon. A single body of these compounds may be used as the active material. Alternatively, a combination of these compounds may be used as the active material.

When the active material layer is distributed on the negative electrode 12, the active material layer may be applied to a current collector to form the negative electrode 12. Any suitable current collector may be used as long as the current collector has suitable conductivity. The current collector may be, for example, a foil or a mesh of copper, stainless steel, titanium or nickel. Further, any other suitable part of the battery 10 including these materials may act as the current collector.

The positive electrode 14 may be any electrode suitable for producing a discharge product that includes magnesium and oxygen, such as magnesium oxide (MgO), magnesium peroxide ($MgO_2$), and magnesium superoxide ($Mg(O_2)_2$), during discharge of the battery 10. The magnesium oxide product can be any binary compound containing $Mg_xO_y$, where "x" and "y" are integers and X may or may not be equal to Y. For example, the magnesium oxide product may be $MgO_2$. The positive electrode 14 can be preloaded with an $MgO_2$ promoter (or accelerator) in order to promote production of $MgO_2$ during discharge of the battery 10. The $MgO_2$ promoter may be preloaded on the positive electrode 14 in any suitable manner. For example and as illustrated in FIG. 1, the positive electrode 14 may have a catalyst layer 30 that includes at least a compound that promotes the formation of discharge products, such as the $MgO_2$ promoter. The promoter may be provided in many other suitable forms as well, as described herein. The catalyst layer 30 may be arranged adjacent to the non-aqueous electrolyte solution 16, and between the non-aqueous electrolyte solution 16 and a gas diffusion layer 34. The gas diffusion layer 34 is between the catalyst layer 30 and a current collector 32.

In order to promote $MgO_2$ production during discharge, an oxygen molecule is required to be adsorbed and reduced in a molecular state on the positive electrode. In this case, the disassociation of $O_2$ to atomic oxygen is inhibited, as is the formation of MgO. The $MgO_2$ promoter can be any suitable promoter for $MgO_2$ production during discharge. Any suitable promoter capable of adsorbing and reducing oxygen with molecule state may be used.

Between the catalyst layer 30 and the negative electrode 12 is a separator 40. The separator 40 can be any suitable separator, such as a Glass Fiber Separator (ECC1-01-0012-A/L) from EL-Cell GmbH of Germany. The separator 40 can be any suitable separator configured to insulate the negative electrode 12 and the positive electrode 14 electrically so that the non-aqueous electrolytic solution 16 permeates the separator 40. The separator 40 can be, for example, a porous synthetic resin film such as polyolefin polymer porous film. Specifically, the separator 40 can be a polyethylene polymer porous film or a poly propylene porous film. Alternatively, the separator 40 may be a resin non-woven cloth, a glass fiber non-woven cloth, or the like. The non-aqueous electrolytic solution 16 is between the catalyst layer 30 of the positive electrode 14 and the negative electrode 12. The electrolyte solution 16 may be any suitable electrolyte solution, such as a non-aqueous magnesium ion conductor, suitable for providing conduction of a magnesium ion between the negative electrode 12 and the positive electrode 14. The electrolyte solution 16 can be $(PhMgCl)_4$—$Al(OPh)_3$, in tetrahydrofuran (THF) $((CH_2)_4O)$, with "Ph" being any suitable $C_6H_5$ phenyl group. The promoter can be used with any other magnesium electrolyte, such as all-phenyl complex (APC) or magnesium aluminum chloride complex (MACC). The solvent is not limited to THF, and thus any other solvent and ionic liquid can be used instead of THF.

The non-aqueous electrolytic solution 16 may include any suitable organic solvent, such as one kind or a combination of multiple kinds of conventional non-aqueous electrolytic solutions. For example, the organic solvent may be cyclic ester, chained ester, cyclic ether, chained ether, cyclic carbonate, chained carbonate, or a combination of these solvents. Specifically, an exemplary chained ether compound is diethylene glycol dimethyl ether. An exemplary cyclic ether compound is tetrahydrofuran. An exemplary cyclic carbonate is ethylene carbonate or propylene carbonate. An exemplary chained carbonate is dimethyl carbonate or diethyl carbonate. When the non-proton organic solvent has a high degree of solubility of oxygen, the oxygen dissolved is used effectively for the reaction. The ionic liquid is not limited to a specific liquid as long as the ionic liquid is used for the non-aqueous electrolytic solution in the rechargeable battery 10. An exemplary cation component is 1-methyl-3-ethyl imidazolium cation or diethyl methyl (methoxy) ammonium cation. An exemplary anion component is $BF_4^-$ or $(SO_2C_2F_5)_2N^-$.

The positive electrode 14 can be an air electrode including any suitable active material, such as oxygen gas. As illustrated in FIG. 1, the battery 10 can include an oxygen inlet 36A (and an oxygen outlet 36B) for introducing external air with oxygen, such as atmospheric aft, by way of perforated current collector 32 and gas diffusion layer 34 for diffusing the oxygen gas to the catalyst layer 30. More specifically, the oxygen inlet 36A can extend through a cap 80 of the battery 10, which can be a stainless steel cap 80, and through a bore 82 defined by a polytetrafluoroethylene (PTFE) rod 84 arranged between the cap 80 and the current collector 32 to direct oxygen to the current collector 32. The PTFE rod 84 can include a spring 86, or any other suitable device, to compress the contents of the battery 10. The spring 86 may be any suitable conductive spring, such as a gold plated spring. Thus, the cap 80 can be conducted to the positive electrode 14 by way of the gold plated spring 86 press-bonded to the current collector 32 and insulated from the stainless steel of the lower casing 20. A polytetrafluoroethylene (PTFE) layer 90 insulates the negative electrode 12 and the positive electrode 14. The oxygen gas may be in the external air or supplied from a high concentration oxygen container, which can be filled using any suitable method. For example, the oxygen gas may be supplied from a pure oxygen gas container or other oxygen storage device.

The gas diffusion layer 34 can be any suitable gas diffusion layer. For example, the gas diffusion layer 34 can include carbon paper (Sigracet 25 BC) made by Ion Power, Inc., for example). The gas diffusion layer 34 can be mounted on the current collector 32. An electrical connection point 88 for the positive electrode 14 can be included at the cap 80. The positive electrode 14 can thus be an air electrode including the current collector 32, the catalyst layer 30, the carbon paper of the gas diffusion layer 34, and the oxygen gas.

The catalyst layer 30 includes at least a compound that promotes the formation of discharge products, such as the promoter $MgO_2$. In view of the smooth progression of the electrochemical reaction, the catalyst and/or the catalyst layer 30 may have high conductivity. In this case, the $MgO_2$ promoter may include a conductive member and/or a bonding member for bonding the conductive member and the promoter. The conductive member may be any suitable conductive member having suitable conductivity. For example, the conductive member may be carbon material or metallic powder. The carbon material can be, for example, graphite, acetylene black, ketjen black, carbon black, or carbon fiber. The bonding member can be any suitable bonding member. For example, the bonding member can be polyvinylidene difluoride (PVDF), polytetrafluoroethylene (PTFE), fluorinated ethylene ethylene-propylene copolymer (fluorine resin copolymer), or rubber resin such as ethylene propylene diene monomer (EPDM), styrene-butadiene rubber, and nitrile rubber.

The $MgO_2$ promoter can be provided in any suitable form. For example, the promoter can be: (1) a compound added to the positive electrode (for example, a coating on the catalyst layer (such as a powder) or an additive to, or specific composition of, the electrolyte); (2) a special architecture or design of the positive electrode (for example, a catalyst layer with a tuned pore size); or (3) an operating procedure (for example, discharging the cell at a slightly reduced temperature). With respect to (1), one example of a promoting additive would be $MgO_2$ powder. With respect to (3), lowering the operating temperature of the battery below ambient should increasingly favor discharge to $MgO_2$ because the stability of this phase increases with decreasing temperature. The $MgO_2$ promoter can be provided in powder, granular, or fibrous form. The catalyst layer 30 can be formed such that the $MgO_2$ promoter powder, granules, or fibers are mixed with the conductive member and/or the bonding member, and suspended in solvent to form a slurry. The slurry is applied to one or both surfaces of the gas diffusion layer 34, and then dried. After the slurry is dried, the current collector 32 can be compressed in any suitable manner. Any suitable solvent can be used. For example, the solvent can be N-Methyl-2-Pyrrolidone (NMP).

Figure 2:
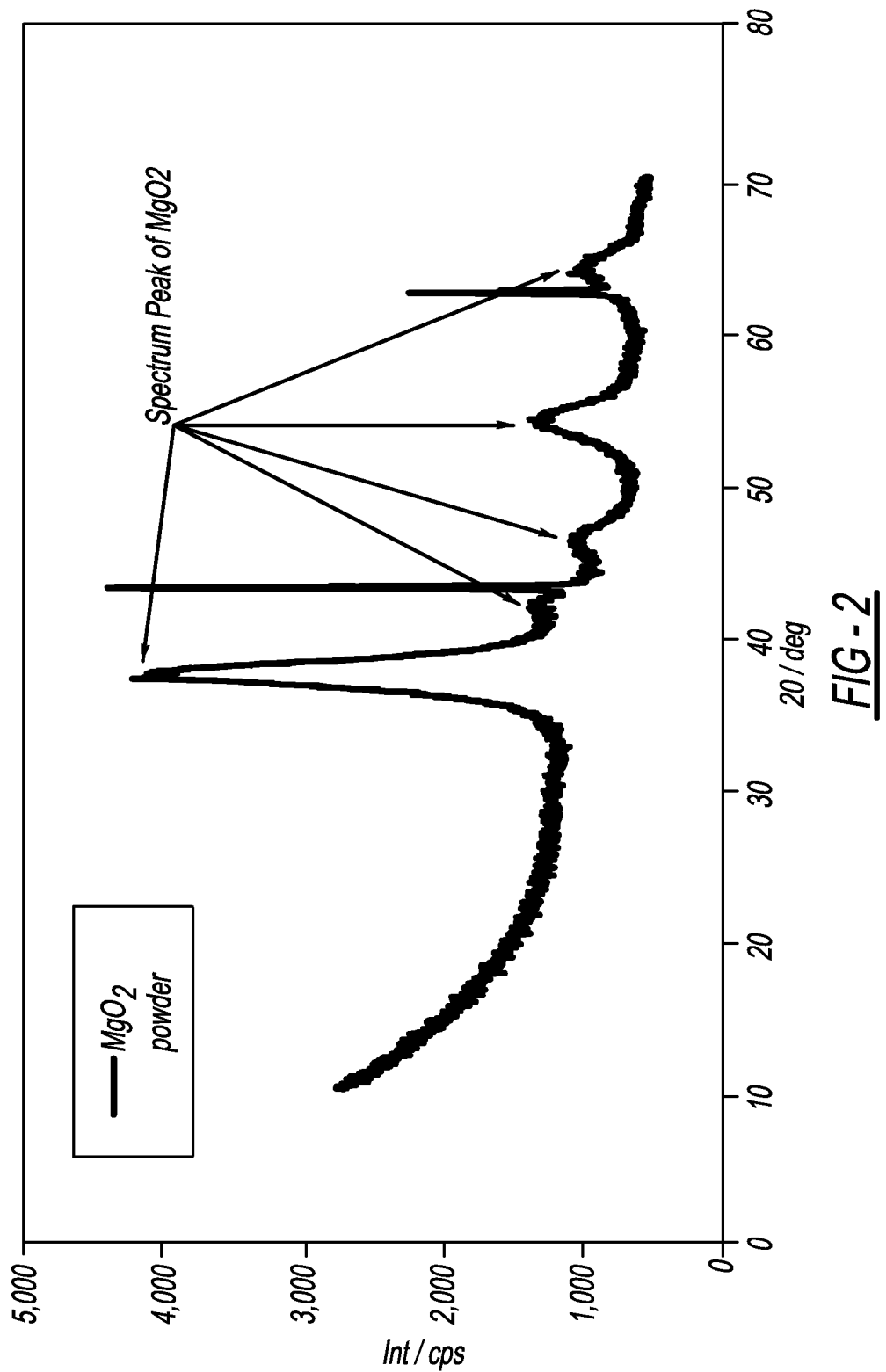
FIG. 2 is a chart illustrating x-ray diffraction (XRD) analysis of $MgO_2$ powder synthesized according to the present teachings.

An exemplary procedure for synthesizing $MgO_2$ powder includes adding $Mg(OH)_2$ (1 g) to 85% $H_2O_2$ (50 ml), and stirring for two hours at 40 C to form $MgO_2$. The $MgO_2$ particles are then separated from $H_2O_2$ and washed by ethanol using centrifugation. The washed $MgO_2$ particles are dried in an oven. FIG. 2 is a chart illustrating x-ray diffraction (XRD) analysis of $MgO_2$ powder synthesized according to the present teachings.

The $MgO_2$ promoter can be prepared, for example, such that a sheet of the catalyst layer 30 has 35 parts weight of the $MgO_2$ particles, 50 parts weight of ketjen black as the conductive element (i.e., KB-ECP600JD made by Ketjen Black International Company), and 15 parts weight of PTFE powder (i.e., D-2C made by Sigma-Aldrich Co. LLC), which are mixed and kneaded in a mortar by a dry method. 4 milligrams of the sheet of the catalyst layer 30 can be press-bonded to any suitable gas diffusion layer 34 and current collector 32, such as a stainless steel current collector coated with platinum.

The gas diffusion layer 34 diffuses the oxygen gas introduced from the inlet 36A to the catalyst layer 30 during a discharge reaction of the battery 10. When the battery 10 is being recharged, the gas diffusion layer 34 diffuses the produced oxygen gas to the gas outlet 36B. The gas diffusion layer 34 may be, for example, a conductive sheet made of carbon or the like and may be porous. For example, the gas diffusion layer 34 can include carbon paper, a carbon cloth, or a carbon felt, for example.

The current collector 32 is configured to collect current, which is generated by the electrochemical reaction of the battery 10. The current collector 32 can be made of any material having suitable conductivity. For example, the current collector 32 can include nickel, stainless steel, platinum, aluminum, or titanium. The current collector 32 can have any suitable shape, and can be a foil, a plate, or a mesh, for example. To secure diffusion of the oxygen gas, the current collector 32 can have a mesh shape, for example. In the example illustrated, the current collector 32 can be perforated and include stainless steel coated with platinum.

The battery 10 is not limited to a specific shape. For example, the battery 10 can have a coin shape, a cylindrical shape, a square shape, or the like. The battery 10 is not limited to a specific vessel. For example, the vessel may be a vessel made of metal or resin, which maintains an outer shape, a soft vessel such as laminate pack, or the like. The vessel of the battery 10, may be an open-air type vessel or a closed type vessel when the battery 10 includes the air electrode.

During discharge of the battery 10, discharge products that include at least magnesium and oxygen, as explained above, are produced at the positive electrode 14. The discharge products, such as $MgO_x$, ($MgO$, $MgO_2$, or $Mg(O_2)_2$), are produced during the discharging process using oxygen as the positive electrode active material. With respect to magnesium peroxide ($MgO_2$), the electrochemical reaction to be promoted at the positive electrode 14 in the discharging process is the following:

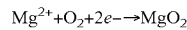
$$Mg^{2+}+O_2+2e- \rightarrow MgO_2$$

With respect to magnesium oxide (MgO), the electrochemical reaction to be promoted at the positive electrode 14 in the discharging process is:

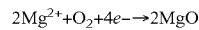
$$2Mg^{2+}+O_2+4e- \rightarrow 2MgO$$

With respect to $MgO_2$, The electrochemical reaction promoted at the positive electrode 14 during charging of the battery 10 is the following:

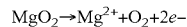
$$MgO_2 \rightarrow Mg^{2+}+O_2+2e-$$

With respect to MgO, the electrochemical reaction promoted at the positive electrode 14 during charging of the battery 10 is the following:

$$2MgO \rightarrow 2Mg^{2+}+O_2+4e-$$

During discharge of the battery 10, at the negative electrode 12 the metal magnesium as the negative electrode active material discharges electrons so that magnesium ions are produced. Thus, the magnesium ions are soluble in the non-aqueous type magnesium ion conductor. At the positive electrode 14, oxygen receives the electrons, which are discharged from the magnesium at the negative electrode, through an external circuit so that the oxygen is reduced and ionized. Further, the oxygen ion is combined with the magnesium ion in the electrolyte solution 16 so that the discharge product is formed according to the reaction above.

When the battery 10 is charged, the discharge product, such as MgO and $MgO_2$, is decomposed so that the electron is retrieved from the product. Thus, the oxygen ion is oxidized to release oxygen. Further, the magnesium ion is released to the non-aqueous electrolytic solution 16 according to the equation above. At the negative electrode 12, the magnesium ion in the non-aqueous electrolytic solution 16 receives the electron, which is retrieved from the magnesium oxide product, through the external circuit, so that the metal magnesium is formed.

Figure 3:
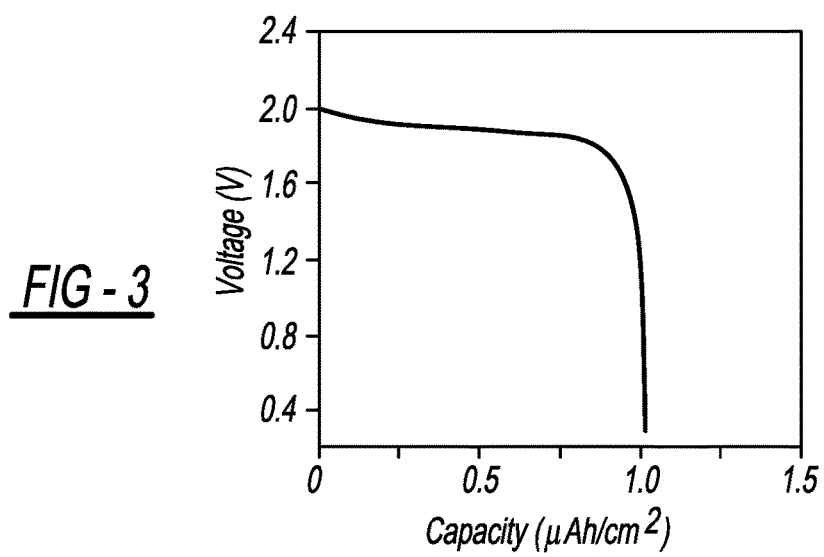
FIG. 3 is a graph of experimental test results showing voltage versus capacity of a battery according to the present teachings including $MgO_2$ as a promoter.

Pre-loading the positive electrode 14 with the $MgO_2$ promoter (regardless of the orientation of the $MgO_2$ promoter) provides numerous advantages, such as by providing the battery 10 with a high power output, a high energy density, by mass and by volume, resulting from an increased discharge voltage. The discharge voltage can be increased by any suitable amount, such that the discharge voltage is greater than the 1.1V often realized without $MgO_2$ pre-loading, and with a 2,2,6,6-tetramethylpiperidine-oxyl (TEMPO) anion complex used to promote MgO production. See J. Phys. Chem. Lett., 2014, 5(10), pp. 1648-1652. For example, when the positive electrode 14 is preloaded with the $MgO_2$ promoter, such as in the catalyst layer 30, the discharge voltage of the battery 10 is at least 1.8V. FIG. 3 is a graph of experimental test results of the battery 10 illustrating the exemplary discharge voltage of 1.8V versus capacity of the battery 10 including the $MgO_2$ promoter. When a 2,2,6,6-tetramethylpiperidine-oxyl (TEMPO) anion complex is used to promote MgO production, for example, the discharge voltage of the battery 10 is only 1.1V. See J. Phys. Chem. Lett., 2014, 5(10), pp. 1648-1652.

Figure 4A:
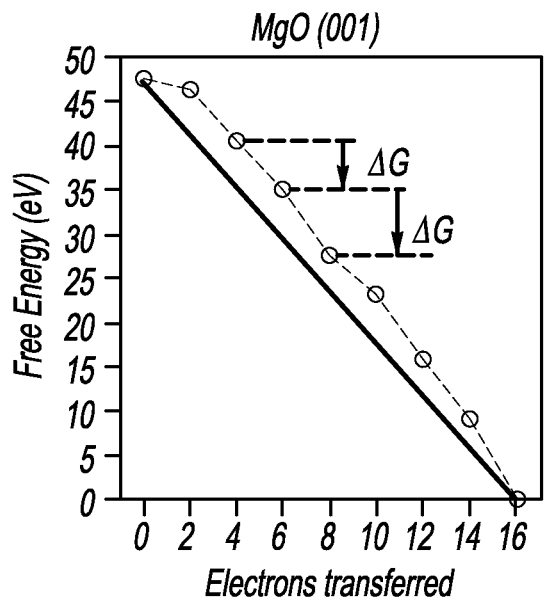
FIGS. 4A, 4B, and 4C, illustrate results of a discharge simulation performed in accordance with the present teachings.
Figure 4B:
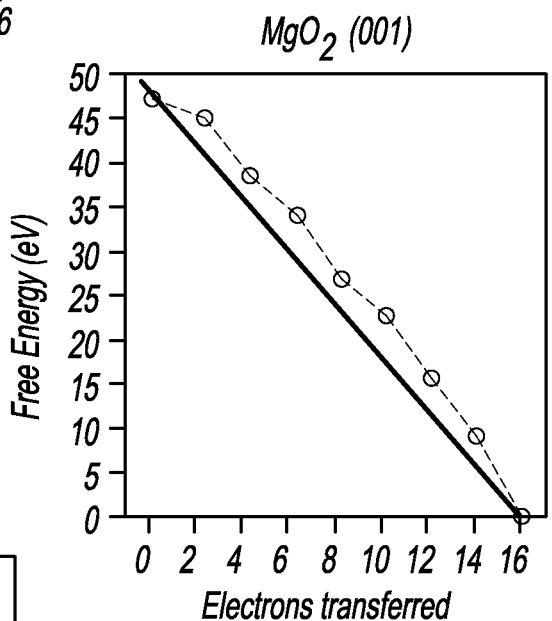
Figure 4C:
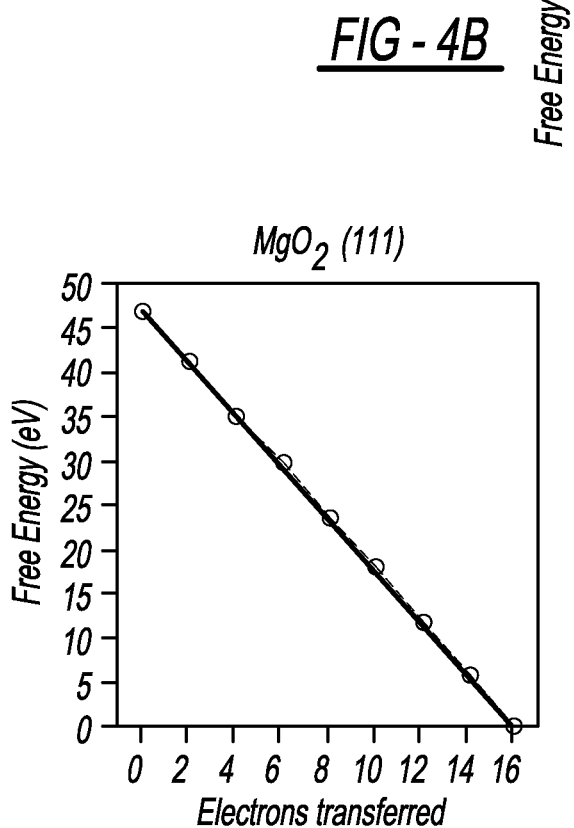

The discharge voltage of the battery 10 can be further increased by preloading the positive electrode 14 with an $MgO_2$ promoter that promotes the formation of specific surface terminations on the $MgO_2$ discharge product, according to the simulation explained below, data from which is illustrated in FIGS. 4A-4C. For example, if the MgO$_2$ surface is a stoichiometric (001) termination, the discharge is increased to at least 1.3V. As another example, if the MgO$_2$ surface orientation is (111), the discharge voltage of the battery 10 is further increased to at least 2.6V. The present teachings thus advantageously provide a high energy density (by mass and by volume) magnesium oxygen battery 10 with an increased voltage due to the presence of an MgO$_2$ promoter preloaded on the positive electrode 14. Any other suitable MgO$_2$ surface termination can be used as well, such as, but not limited to, the following: (110), (210), and (211). A function of the promoter/process is to form an MgO$_2$ discharge product that has oxygen-rich (or superoxide-like) surfaces. This type of discharge product is predicted to yield the highest discharge voltages, and to enable rechargeability at the lowest voltages. For example, FIG. 4A illustrates that if MgO is formed (whose stable crystallite surfaces are (001)), then the overvoltages associated with discharge and charge are high. FIG. 4B illustrates that an MgO$_2$ discharge product with stoichiometric (001) surfaces also has high overvoltages for discharge and charge. However, if the discharge product can be tuned (via a promoter/promotion mechanism) to instead yield an MgO$_2$ discharge product with oxygen rich surfaces, then the over voltages will be much smaller, as illustrated in FIG. 4C for example. Below is a table that sets forth behavior for several different scenarios. The oxygen-rich surfaces of MgO$_2$ (the last two columns of the table) provide the best performance.

TABLE 1

Calculated limiting potentials, thermodynamic overvoltages, and efficiencies associated with various discharge and charging reactions in an Mg/O$_2$ cell. Values in regular text (i.e., outside of the parentheses) refer to reactions occurring at terrace-sites. Values in parentheses refer to non-terrace reactions, which are limiting only for the superoxide-terminated surfaces, Orich-1 and Orich-3.

| Discharge product, surface, and reaction mechanism | Limiting Potential (V) | | Overvoltage (V) | | Voltaic Efficiency (%) |
|---|---|---|---|---|---|
| | Discharge | Charge | Discharge | Charge | |
| MgO (100) Stoi [Single-step] | 0.70 | 4.45 | 2.25 | 1.50 | 16 |
| MgO (100) Stoi [Multi-step] | 1.15 | 3.98 | 1.80 | 1.03 | 29 |
| MgO$_2$ (100) Stoi [Single-step] | 0.92 | 4.69 | 2.02 | 1.75 | 20 |
| MgO$_2$ (100) Stoi [Multi-step] | 1.31 | 4.04 | 1.63 | 1.10 | 33 |
| MgO$_2$ (111) Orich-1 [Single-step] | 2.76 (2.61) | 3.01 (3.25) | 0.18 (0.33) | 0.07 (0.31) | 92 (80) |
| MgO$_2$ (100) Orich-3 [Single-step] | 2.83 (2.63) | 3.27 (3.29) | 0.11 (0.31) | 0.33 (0.35) | 87 (80) |

Limiting potentials were evaluated using Density Functional Theory (VASP code). This treatment models the discharge process as a series of reaction events onto the surface of an existing particle of the discharge product. The reaction pathway is defined as the combination of all elementary electrochemical reaction steps required for the formation of a single formula-unit layer of the discharge product. Free energy diagrams are illustrated in FIGS. 4A-4C. The discharge voltage, U$^{discharge}$, is determined by the least exothermic reaction step (i.e., potential limiting step), $$U^{discharge} = \min\left|\frac{\Delta G_{rxn,i}}{ev_{e^-}}\right|.$$

Here, $\Delta G_{rxn,i}$ refers to an elementary electrochemical reaction step i, e is the charge of an electron and v is the stoichiometric coefficient of the electron in the reaction. The predicted discharge voltages for the MgO (100), MgO$_2$ stoichiometric (100), MgO$_2$ oxygen-rich (100) and MgO$_2$ oxygen rich (111) terminations are 1.15V, 1.31V, 2.63V, and 2.61V respectively. An analogous procedure has been used to predict the limiting potential for charging, U$^{charge}$, shown in the 3$^{rd}$ column of Table 1. Calculated overvoltages are reported in columns 4-5. These are evaluated as the absolute value of the difference between the theoretical cell voltage (2.95V for MgO, 2.94V for MgO$_2$) and the limiting potential. The voltaic efficiency, column 6, is given by the ratio of the limiting discharge voltage to the limiting charge voltage.

While the present disclosure has been described with reference to embodiments thereof, it is to be understood that the disclosure is not limited to the embodiments and constructions. The present disclosure is intended to cover various modification and equivalent arrangements. In addition to the various combinations and configurations described, other combinations and configurations, including more, less or only a single element, are also within the spirit and scope of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A non-aqueous type magnesium oxygen battery comprising:
   a negative electrode configured to absorb magnesium and release magnesium ion;
   a positive electrode configured to produce a discharge product that includes magnesium and oxygen during a discharge process of the battery;
   a non-aqueous magnesium ion conductor between the negative electrode and the positive electrode;
   a promoter included with the positive electrode, the promoter is configured to promote $MgO_2$ (magnesium peroxide) production during the discharge process of the battery; and
   wherein the promoter is $MgO_2$.

2. The non-aqueous type magnesium oxygen battery of claim 1, wherein the promoter is configured to adsorb magnesium ion.

3. The non-aqueous type magnesium oxygen battery of claim 1, wherein the promoter is configured to adsorb or reduce molecular oxygen without a dissociation reaction to atomic oxygen.

4. The non-aqueous type magnesium oxygen battery of claim 1, wherein the promoter includes $MgO_2$, conductive member and bonding member.

5. The non-aqueous type magnesium oxygen battery of claim 1, wherein the promoter promotes formation of $MgO_2$ with (111) facets.

6. The non-aqueous type magnesium oxygen battery of claim 1, wherein the promoter promotes formation of $MgO_2$ with (001) facets that are stoichiometric or oxygen-rich.

7. The non-aqueous type magnesium oxygen battery of claim 1, wherein the battery is configured to provide a discharge voltage of greater than 1.1 volts.

8. The non-aqueous type magnesium oxygen battery of claim 1, wherein the battery is configured to provide a discharge voltage of at least 1.8 volts.

9. The non-aqueous type magnesium oxygen battery of claim 5, wherein the battery is configured to provide a discharge voltage of at least 2.6 volts.

10. A non-aqueous type magnesium oxygen battery comprising:
    a negative electrode configured to absorb magnesium and release magnesium ion;
    a positive electrode configured to produce a discharge product that includes magnesium and oxygen;
    a promoter included with the positive electrode, the Promoter includes $MoO_2$, and the promoter promotes formation of $MgO_2$ having a (111) facet; and
    a non-aqueous magnesium ion conductor between the negative electrode and the positive electrode;
    wherein the battery is configured to provide a discharge voltage of greater than 1.1 volts.

11. The non-aqueous type magnesium oxygen battery of claim 10, wherein the battery is configured to provide a discharge voltage of at least 1.8 volts.

12. The non-aqueous type magnesium oxygen battery of claim 10, wherein the battery is configured to provide a discharge voltage of at least 2.6 volts.

* * * * *

UNITED STATES PATENT AND TRADEMARK OFFICE
CERTIFICATE OF CORRECTION

PATENT NO. : 9,960,467 B2  
APPLICATION NO. : 14/955397  
DATED : May 1, 2018  
INVENTOR(S) : Naruse et al.

Page 1 of 1

It is certified that error appears in the above-identified patent and that said Letters Patent is hereby corrected as shown below:

On the Title Page

Column 1, (73) Assignees, Lines 1-2, delete "Kariya, Aichi-pref." and insert --Kariya-shi, Aichi-ken-- therefor Column 2, (57) Abstract, Line 8, delete "on" and insert --ion-- therefor In the Claims Column 10, Claim 10, Line 44, delete "Promoter" and insert --promoter-- therefor Column 10, Claim 10, Line 44, delete "$MoO_2$," and insert --$MgO_2$,-- therefor Signed and Sealed this  
Twenty-fifth Day of September, 2018

Andrei Iancu  
*Director of the United States Patent and Trademark Office*